(No Model.)

W. WOLFF.
LATHE CHUCK.

No. 528,705. Patented Nov. 6, 1894.

Attest.
Ida Stutz
Samuel M. Quinn

Inventor.
William Wolff.
by James H. Layman.
Atty.

UNITED STATES PATENT OFFICE.

WILLIAM WOLFF, OF CINCINNATI, OHIO.

LATHE-CHUCK.

SPECIFICATION forming part of Letters Patent No. 528,705, dated November 6, 1894.

Application filed June 21, 1894. Serial No. 515,222. (No model.)

*To all whom it may concern:*

Be it known that I, WILLIAM WOLFF, a citizen of the United States, residing at Cincinnati, in the county of Hamilton and State of Ohio, have invented certain new and useful Improvements in Lathe-Chucks; and I do hereby declare the following to be a full, clear, and exact description of the invention, reference being had to the annexed drawings, which form a part of this specification.

This invention relates to those lathe chucks which include a head, a series of jaws radially adjustable therein, levers for operating said jaws, and a conical nut capable of being advanced and retracted along an externally-threaded stock, so as to close and open said jaws; and my improvement comprises a novel combination of parts that enables the levers to be shifted slightly, and the jaws to be detached and then turned end for end, which changes can be readily effected without disengaging screws, or bolts, or other attachments of the device, as hereinafter more fully described.

Figure 1:
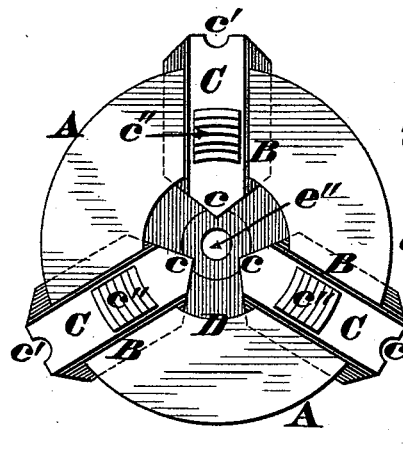
Figure 3:
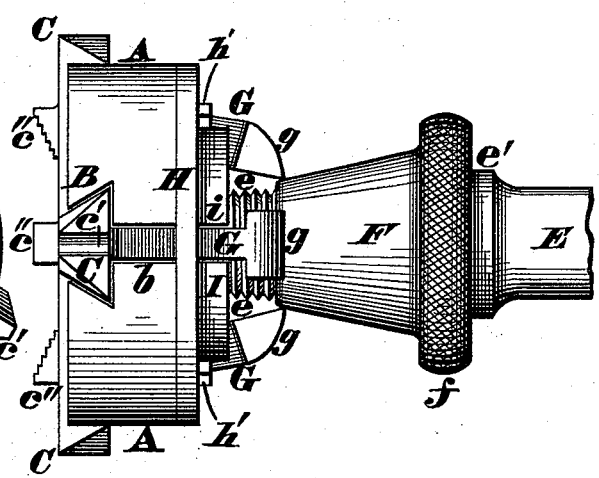
Figure 2:
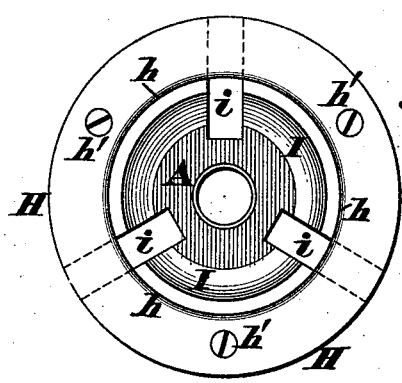
Figure 4:
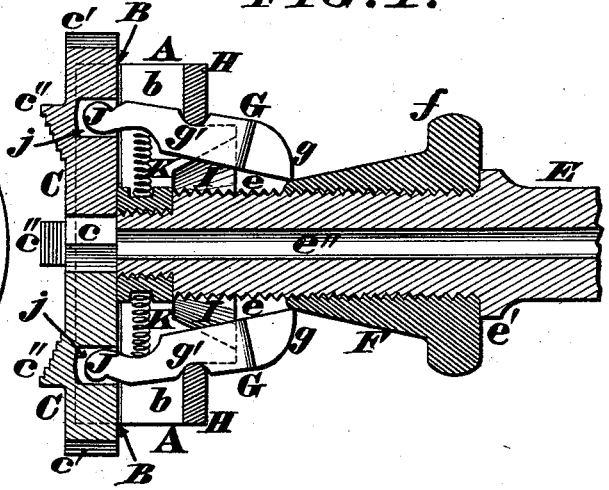
Figure 5:
Figure 6:
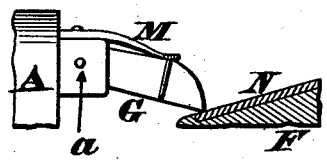

In the annexed drawings, Figure 1 is a front elevation showing the head of my lathe-chuck provided with three radial-jaws. Fig. 2 is a rear elevation of said head, the jaws, stock and levers being detached therefrom. Fig. 3 is a plan of a chuck provided with four jaws. Fig. 4 is an axial section thereof. Figs. 5 and 6 show two modifications of the invention.

The principal member of the chuck is a head or disk A, having a radial groove B, for each of the jaws C, of which latter as many may be used, as circumstances call for. These grooves are wider at rear than in front, as more clearly seen in Fig. 3, and their inner ends communicate with a central circular-countersink D. Seen in Fig. 1. The jaws C, which fit snugly within said grooves, are pointed at $c$, notched at $c'$, and stepped at $c''$, to hold various kinds of work; but especially such pieces as are generally used by watchmakers. Screwed into this head, in the manner seen in Fig. 4, is a stock E, capable of being attached to a lathe in the usual way, the exterior of said stock being screw-threaded at $e$, and an annular flange or collar $e'$ being provided at the rear end of this thread. Furthermore, this stock has an axial bore $e''$, to permit the passage of a wire or light rod before being grasped by the jaws; a conical nut F, having a milled-head $f$, being engaged with the screw $e$ of said stock. Adapted to bear upon this nut are the rear or exposed ends $g$ of a number of levers G, of the first class, each lever being notched at $g'$, to afford a bearing against the inner, rounded periphery $h$ of a ring H, the latter being fastened to the rear of head A by screws $h'$, as seen in Fig. 2. This ring fits snugly around an annular hub I, which is integral with the head A and slotted at $i$ to guide the levers G, said slots $i$ being in line with slots $b$ extending rearwardly from the radial slots B, as more clearly seen in Fig. 3. The bore of hub I flares outwardly, as represented in Fig. 4 to permit an entrance of the smaller or front end of the nut F. The front end of lever G has a rounded bearing J, that enters a socket $j$ in the back of the jaw, the latter being maintained in its normal position by a coiled spring K located at the inner end of the slot $b$.

From the above description it is evident that when the nut F is run back on the stock E, as far as the stop $e'$ will permit, the bearings $g$ of the levers G will be in contact with the smaller end of said nut, the levers being held in this position by the outward thrust of their respective springs K. Consequently, the jaws C are now forced outwardly, to their utmost range, thereby bringing their points $c$ to the position seen in Fig. 1, and enabling the insertion of a piece of work within the countersink D, and between these points, after which act, the nut F is so turned as to advance it along the thread $e$. It is evident that this advancement of the nut causes the bearings $g$ to gradually ride up its inclined sides, the result being a swinging of the levers on the ring-fulcrum H, and the regular and simultaneous approach of the points $c$ nearer and nearer to each other, until they finally grasp the piece of work, and then the operator ceases to turn said nut. It is apparent that the piece thus grasped is held immovably in the exact center of the chuck, and can then be finished in any desired manner.

When it is desired to use the notched ends $c'$ of the jaws, the nut F is run back to the stop $e'$, the levers G are pressed down to disengage their notches $g'$ from the ring H, and are then slipped back a slight distance to pull the bearings J of said levers out of the sockets $j$ of said jaws. The latter can then be pulled out of the grooves B, turned, end for end, and reseated within said grooves, after which act, the levers are again engaged with the jaws and fulcrum-ring, and the chuck is then operated in the manner above described.

From the above description it is evident that the reversal of the jaws, which expedient greatly enhances the utility of the chuck, is accomplished very expeditiously and without disengaging a screw or bolt, or other attachment, or fixture of any kind whatever.

The steps $c''$ of the jaws enable the ready grasping of the various pinions and wheels used by watchmakers and other skilled artisans.

In the modification of my invention, seen in Fig. 5, an india-rubber band L is passed around the exposed ends of levers G, for the purpose of keeping them in contact with the tapering-nut.

In another modification, seen in Fig. 6, a plate-spring M is used for keeping the lever in contact with a conical-sleeve N, adapted to revolve freely around the nut, thereby indicating that the devices for retaining said levers in their normal positions may be varied to suit circumstances. Finally, these last illustrations show the levers hung upon pins or pivots $a$ instead of being engaged with a common fulcrum-ring; but the concealed ends of these levers must be loosely coupled to the jaws in the manner seen in Fig. 4. These constructions, however, compel the withdrawal of the pivots before the levers can be shifted longitudinally, preparatory to reversing the jaws, and, for this reason, such chucks would not be preferred when many reversals are necessary.

I claim as my invention—

1. The combination, in a chuck, of a head having a series of jaws; longitudinally-shiftable levers, loosely coupled to said jaws; and an adjustable-cone for operating said levers; the arrangement of these devices being such as to enable said jaws to be turned, end for end, without detaching any fixture of the chuck, substantially as herein described.

2. The combination, in a chuck, of a head having a series of grooves; jaws traversing said grooves; a common fulcrum-ring attached to said head; longitudinally-shiftable levers applied to said ring, and loosely coupled to said jaws; and an adjustable-cone that operates said levers; the arrangement of these devices being such as to enable said jaws to be turned, end for end, without detaching any fixture of the chuck, substantially as herein described.

3. The combination, in a chuck, of the head A, provided with radial grooves B $b$; adjustable and reversible jaws C, traversing said grooves; notched levers G $g$, that operate said jaws; a ring H, which serves as a common fulcrum for these levers; a conical nut F, actuating said levers; an externally threaded stock E $e$, that carries said head, and has said nut engaged with it; and means for maintaining said levers in contact with said nut; the arrangement of these various parts being such as to enable the levers to be slightly shifted, and the jaws to be turned, end for end, without detaching any fixture of the chuck, all as herein described.

In testimony whereof I affix my signature in presence of two witnesses.

WILLIAM WOLFF.

Witnesses:
JAMES H. LAYMAN,
SAMUEL M. QUINN.